US010983017B2

(12) United States Patent
LaBelle et al.

(10) Patent No.: US 10,983,017 B2
(45) Date of Patent: Apr. 20, 2021

(54) ELECTROCHEMICAL PRESSURE TRANSDUCER

(71) Applicant: ARIZONA BOARD OF REGENTS ON BEHALF OF ARIZONA STATE UNIVERSITY, Scottsdale, AZ (US)

(72) Inventors: Jeffrey LaBelle, Tempe, AZ (US); Austin Feldman, Scottsdale, AZ (US); Mary Siuba, Scottsdale, AZ (US); Ross Carlton, Tempe, AZ (US); Jeffrey Andrade, Chandler, AZ (US)

(73) Assignee: ARIZONA BOARD OF REGENTS ON BEHALF OF ARIZONA STATE UNIVERSITY, Scottsdale, AZ (US)

( * ) Notice: Subject to any disclaimer, the term of this patent is extended or adjusted under 35 U.S.C. 154(b) by 535 days.

(21) Appl. No.: 14/430,856

(22) PCT Filed: Sep. 25, 2013

(86) PCT No.: PCT/US2013/061711
§ 371 (c)(1),
(2) Date: Mar. 24, 2015

(87) PCT Pub. No.: WO2014/052470
PCT Pub. Date: Apr. 3, 2014

(65) Prior Publication Data
US 2015/0268108 A1 Sep. 24, 2015

Related U.S. Application Data

(60) Provisional application No. 61/705,494, filed on Sep. 25, 2012.

(51) Int. Cl.
*G01N 27/26* (2006.01)
*G01L 1/20* (2006.01)
(Continued)

(52) U.S. Cl.
CPC ............... *G01L 1/205* (2013.01); *G01G 3/14* (2013.01); *G01N 27/02* (2013.01); *G01N 27/403* (2013.01)

(58) Field of Classification Search
USPC ......................................... 204/400
See application file for complete search history.

(56) References Cited

U.S. PATENT DOCUMENTS 5,060,527 A   10/1991   Burgess
5,311,779 A *   5/1994   Teruo ............... A43B 3/0005
                                                        338/4
(Continued)

FOREIGN PATENT DOCUMENTS

WO   2007026152 A1   3/2007
WO   2014025430 A2   2/2014
WO   2014052470       4/2014

OTHER PUBLICATIONS

Carpi et al., Electroactive polymer actuators as artificial muscles: are they ready for bioinspired applications?, Bioinspiration and Biomimetics, Nov. 2011, 6(4):045006(10 pages).
(Continued)

*Primary Examiner* — Thanh Truc Trinh
(74) *Attorney, Agent, or Firm* — Quarles & Brady LLP

(57) ABSTRACT

An electrochemical sensor (100), comprising a substrate (105), two electrodes (130) and (140) screen printed onto said substrate, an elastomer (150) disposed over one of said plurality of screen printed electrodes, and one or more electroactive species disposed within said elastomer.

16 Claims, 13 Drawing Sheets

(51) Int. Cl.
    *G01G 3/14*     (2006.01)
    *G01N 27/02*     (2006.01)
    *G01N 27/403*     (2006.01)

(56) References Cited

U.S. PATENT DOCUMENTS

| | | |
|---|---|---|
| 6,809,462 B2 | 10/2004 | Pelrine et al. |
| 7,694,582 B2 | 4/2010 | Hayakawa et al. |
| 7,854,173 B2 | 12/2010 | Cheng et al. |
| 2002/0078756 A1* | 6/2002 | Akiyama .............. G01L 9/0072 73/718 |
| 2009/0032394 A1* | 2/2009 | Wu ........................... C08J 5/20 204/400 |
| 2009/0137887 A1 | 5/2009 | Shariati et al. |
| 2009/0165569 A1* | 7/2009 | Taya ........................ G01D 5/14 73/862.041 |
| 2010/0012521 A1 | 1/2010 | Feldman et al. |
| 2010/0109917 A1* | 5/2010 | Rudd ................... H03K 17/962 341/20 |
| 2012/0043858 A1* | 2/2012 | Mahapatra ............. B82Y 15/00 310/339 |

OTHER PUBLICATIONS

Supplementary European Search Report, EP 13 84 0371, dated Apr. 29, 2016.

\* cited by examiner

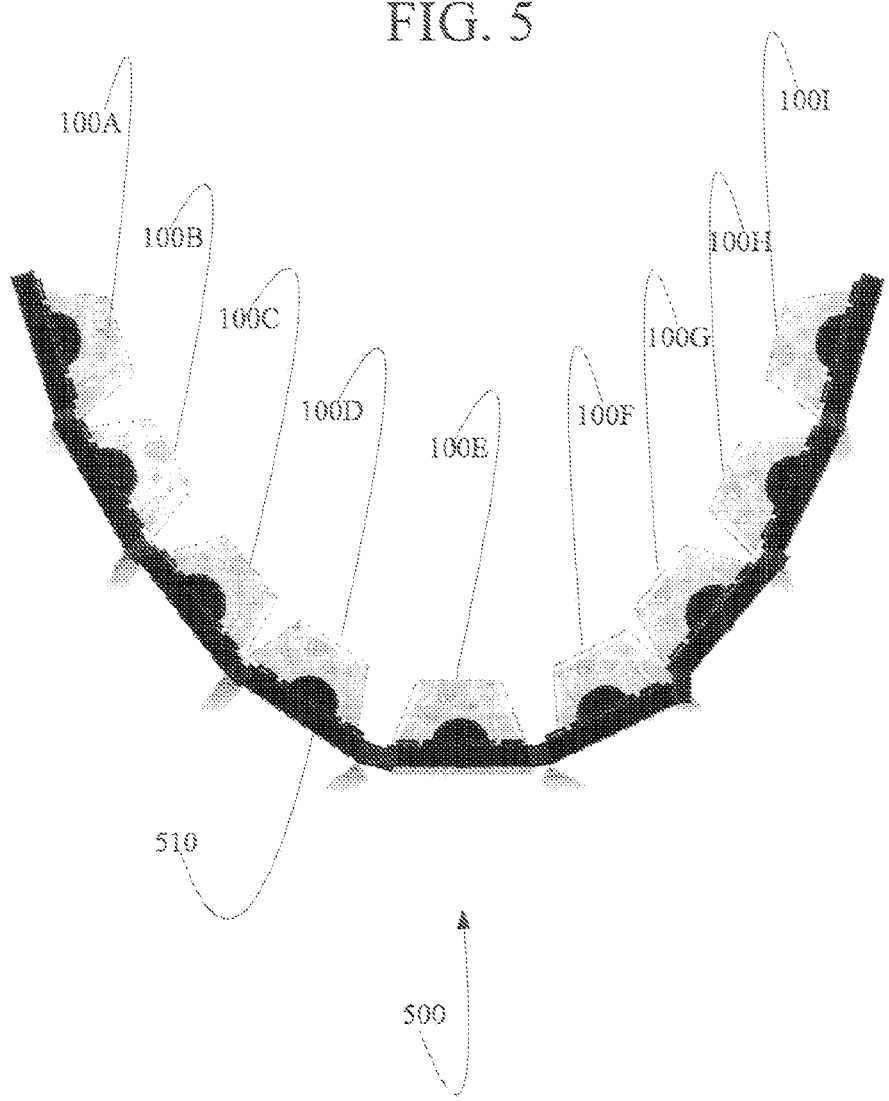

ELECTROCHEMICAL PRESSURE TRANSDUCER

CROSS-REFERENCE TO RELATED APPLICATIONS

This application represents the national stage entry of PCT International Application No. PCT/2013/061711, filed Sep. 25, 2013, which claims the benefit of U.S. Provisional Patent Application No. 61/705,494, filed Sep. 25, 2012, the disclosures of which are incorporated herein by reference for all purposes.

FIELD OF THE INVENTION

The invention is directed to an electrochemical pressure transducer.

BACKGROUND OF THE INVENTION

Assessing pressure and contact stress distributions between two adjacent surfaces is a well established in biomechanics. Typical applications of measuring the interface pressure include human-machine interfaces in ergonomics, joint congruency studies in orthopedics, in-vitro cadaveric experimentation and the design of Orthotic-Prosthetic devices.

The ability to reliably and reproducibly create a plurality of pressure transducers for use in biomechanics would be an advance in the art.

SUMMARY OF THE INVENTION

An electrochemical sensor is presented. In certain embodiments, Applicant's electrochemical sensor comprises a plurality of electrodes screen printed onto a substrate, an elastomer disposed over the plurality of screen printed electrodes wherein the elastomer comprises one or more electroactive species disposed therein, and compressible material disposed over said elastomer.

BRIEF DESCRIPTION OF THE DRAWINGS

The invention will be better understood from a reading of the following detailed description taken in conjunction with the drawings in which like reference designators are used to designate like elements, and in which:

FIG. 5 shows an assembly of nine electrochemical pressure sensors disposed on a flexible substrate;

FIG. 11A shows the data of FIG. 9 used to allow current to be measured against pressure;

DETAILED DESCRIPTION OF THE PREFERRED EMBODIMENTS

Figure 1:
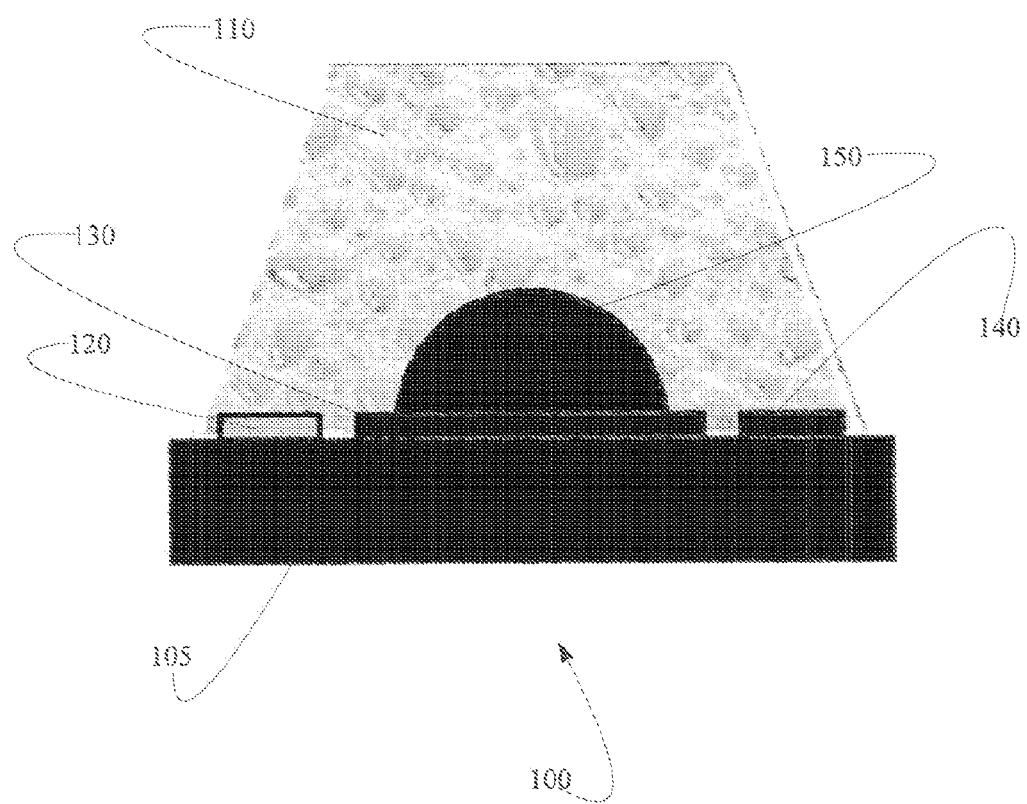
FIG. 1 illustrates Applicant's electrochemical sensor in a non-compressed configuration.

The invention is described in preferred embodiments in the following description with reference to the Figures, in which like numerals represent the same or similar elements. Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

The described features, structures, or characteristics of the invention may be combined in any suitable manner in one or more embodiments. In the following description, numerous specific details are recited to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

The schematic flow charts included are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Applicant's electrochemical sensor comprises one or more electroactive species in near vicinity to a surface of an electrode. As a concentration of the electroactive species changes, under an applied voltage, a current (or impedance) reading will change. In certain embodiments, Applicant's electrochemical sensor comprises a hydrogel, polyurethane foam, elastomeric polymer or similar species, impregnated with ionic compounds, particles, springs, metals, or nanoparticles. When that loaded polymeric material is placed under a force or pressure, such as a compressive force, that force will "move" by physical displacement, the ionic compounds closer to the sensor surface, and thereby, increase the produced and measured current (or impedance).

Referring now to FIG. 1, Applicant's electrochemical sensor 100 comprises a substrate 105, electrodes 130 and 140 screen printed onto substrate 105, a reference electrode 120 screen printed onto substrate 105, elastomer 150 impregnated with ionic compounds or particles disposed over electrode 130, and an polymeric material 110 disposed over electrodes 120, 140, and elastomer 150. In certain embodiments, elastomer 150 comprises a polyurethane foam impregnated with ferricyanide solution in phosphate buffered saline.

Figure 2:
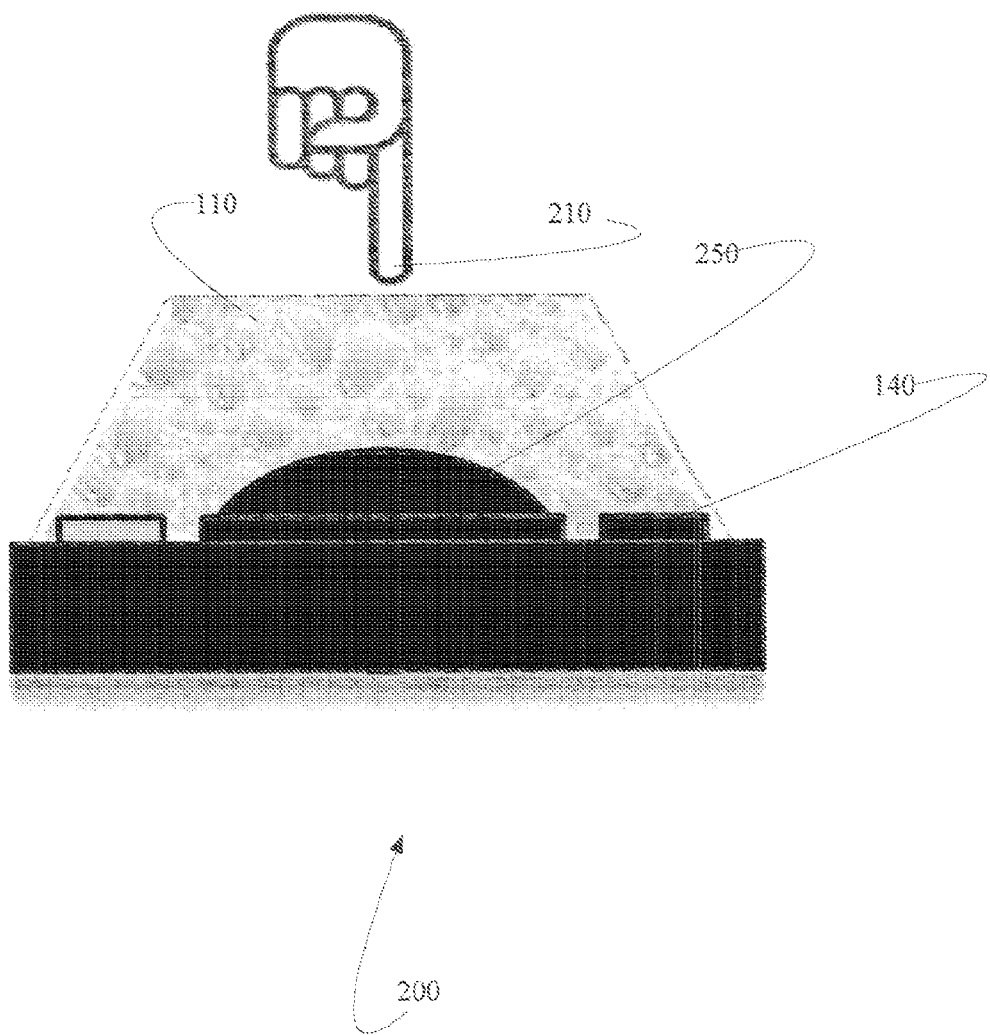
FIG. 2 illustrates Applicant's electrochemical sensor in a compressed configuration.

Referring now to FIGS. 1 and 2, when a compressive force 210 is directed downwardly to polymeric material 110, elastomer 150 of FIG. 1 is flattened to the configuration of elastomer 250 in FIG. 2. The border of elastomer 250 is closer to electrode 140, and therefore, current flow between electrode 130 and electrode 140 increases.

Figure 3:
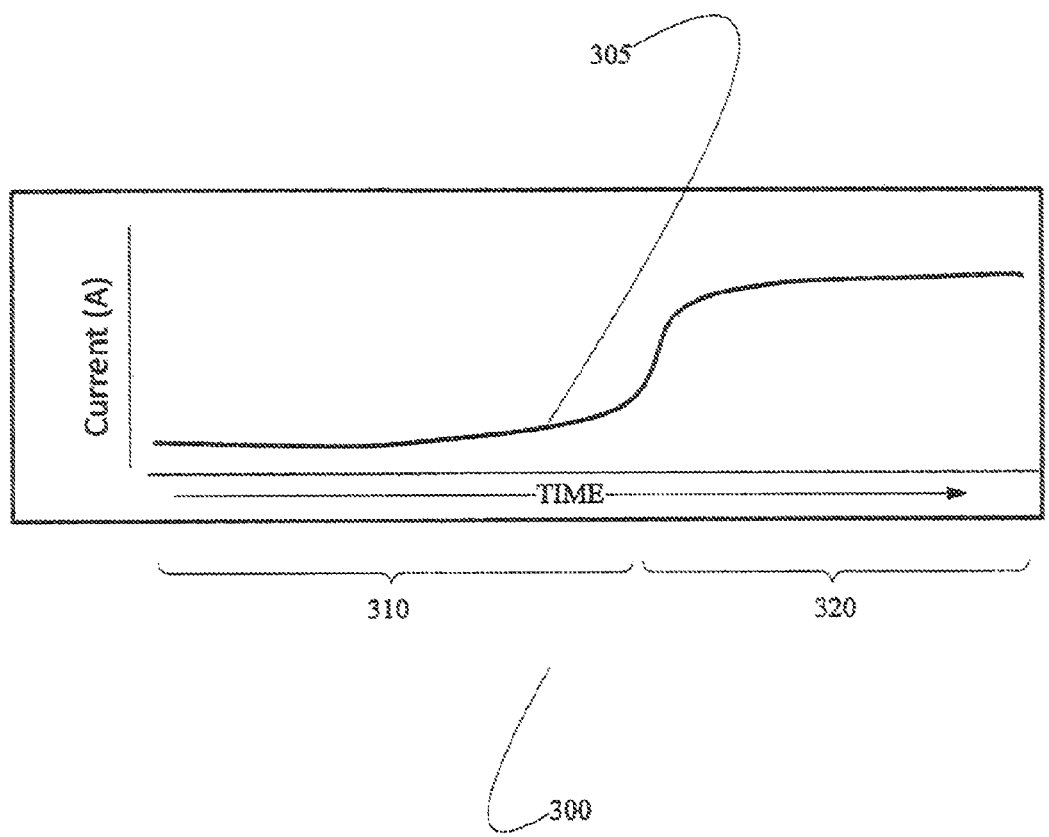
FIG. 3 graphically illustrates the current produced by Applicant's electrochemical sensor in both a non-compressed configuration and in a compressed configuration.

Referring now to FIG. 3, curve 305 shows a complex impedance, also could be basal current. Curve portion 310 shows the current flow when Applicant's electrochemical sensor is in the configuration of FIG. 1. Curve portion 320 shows the current flow when Applicant's electrochemical sensor is in the compressed configuration of FIG. 2.1

Figure 4:
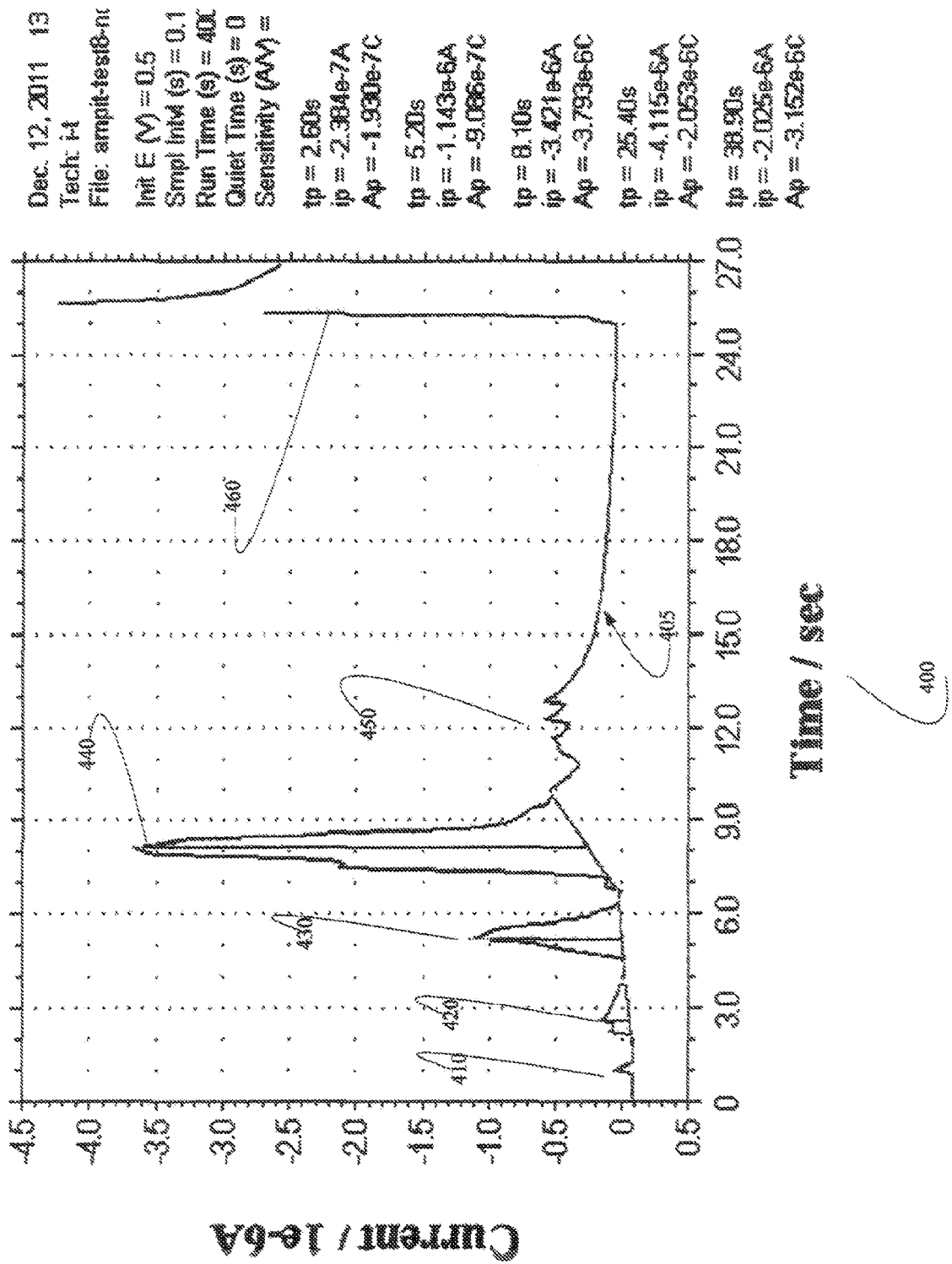
FIG. 4 graphically illustrates a current versus time plot for one embodiment of Applicant's electrochemical sensor when subjected to various compressive forces.

Testing was performed using a styrene-ethylene-butylenes-styrene copolymer coating 110 on top of polyurethane foam impregnated with ferricyanide solution in phosphate buffered saline elastomer 150 on top of commercially available screen printed electrodes 130 and 140. FIG. 4 graphically illustrates an amperometric i*t for the above-described test device.

Curve 410 shows an amperometric i*t observed when Applicant's electrochemical sensor was subjected to a light tap. Curve 420 shows an amperometric i*t observed when Applicant's electrochemical sensor was subjected to a light double tap. Curve 430 shows an amperometric i*t observed when Applicant's electrochemical sensor was subjected to a medium tap. Curve 440 shows an amperometric it observed when Applicant's electrochemical sensor was subjected to a hard tap. Curve 450 shows an amperometric i*t observed when Applicants electrochemical sensor was subjected to a light triple tap. Curve 460 shows an amperometric i*t observed when Applicant's electrochemical sensor was again subjected to a hard tap.

FIG. 5 illustrates a assembly 500 comprising nine (9) individual electrochemical sensors, namely sensors 100A, 100B, 100C, 100D, 100E, 100F, 100G, 100H, and 100I, disposed on a surface 510. Each of the nine sensors is used to measure a degree (angle) and displacement of a finger during a complex action, such as and without limitation, grasping an unbalanced object. In certain embodiments, assembly 500 can be disposed in a prosthetic device to provide biofeedback to a user.

Figure 6A:
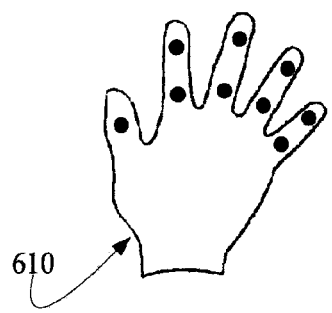
FIGS. 6A and 6B show a total of fourteen electrochemical sensors disposed on a human hand.
Figure 6B:
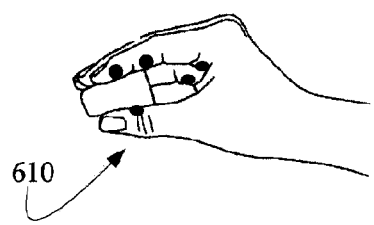
Figure 6C:
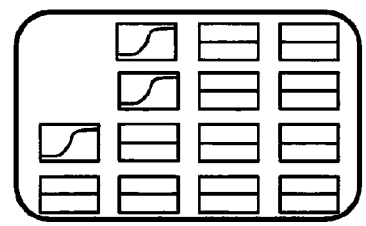
FIG. 6C shows a display device continuously providing graphical current versus time plots for each of the fourteen electrochemical sensors of FIGS. 6A and 6B.

FIGS. 6A and 6B illustrate a top view and a side view of hand 610, respectively, wherein a total of fourteen (14) of Applicant's electrochemical sensors 100 are disposed on hand 610 at various locations. Each of the fourteen electrochemical sensors acts independently, and signals are provided to display device 620. Display device 620 shows an I*t plot for each of the fourteen sensors. When picking up an object using the thumb and index finger, display device 620 continuously indicates where on the hand pressure is being exerted.

Figure 7:
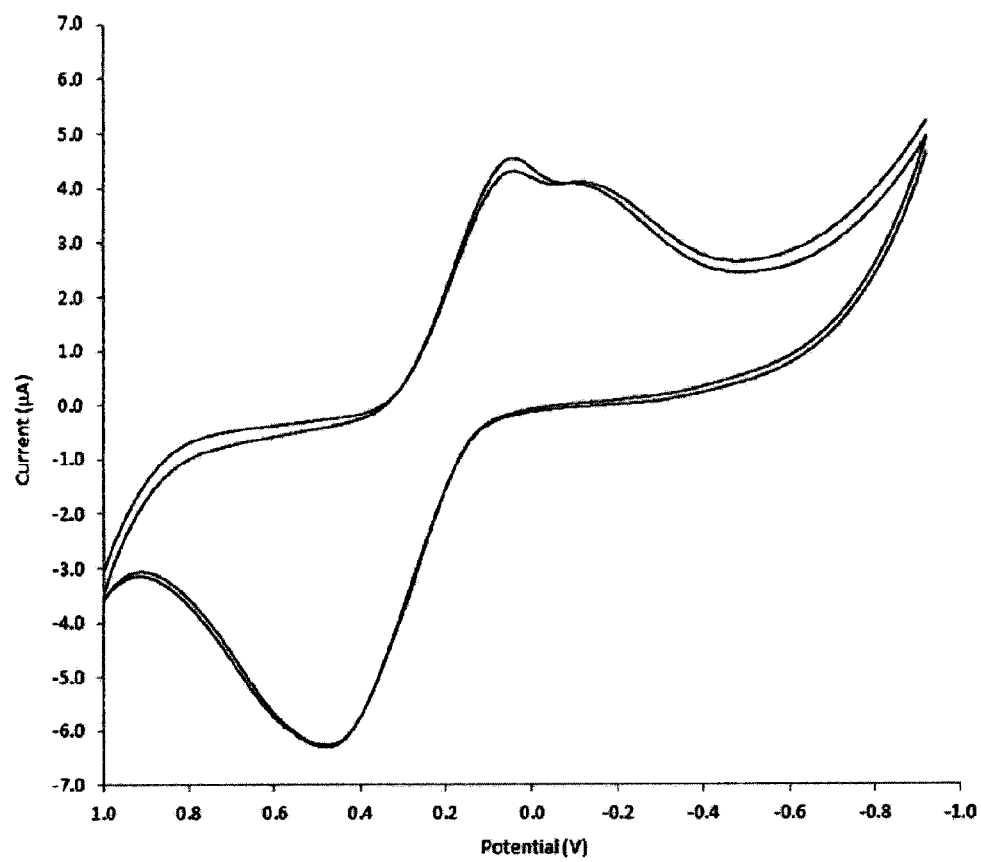
FIG. 7 shows cyclic voltammetry of the EM, including potassium ferricyanide, potassium ferrocyanide, and PBS.

Referring to FIG. 7, illustrates that cyclic voltammetry continuously reads current while applying a varied potential. At the peak current, a voltage can be extracted and used as the current voltage in an Amperometric I-T.

An applied potential can be varied over time, with no pressure applied, and the current measured to determine the oxidation and reduction peaks of a specific material.

In FIG. 7, a reduction reaction occurred due to reducing agent, potassium ferrocyanide, which can be seen at the upper right portion of the figure. There is one prominent reduction peak and a smaller second peak, which could be related to the reaction's chemistry. It is possible that the reducing agent, potassium ferrocyanide, donated two electrons at asynchronous times. An oxidation peak of 0.45 V, seen at the lower left portion of the figure, was extracted from this figure.

Figure 8:
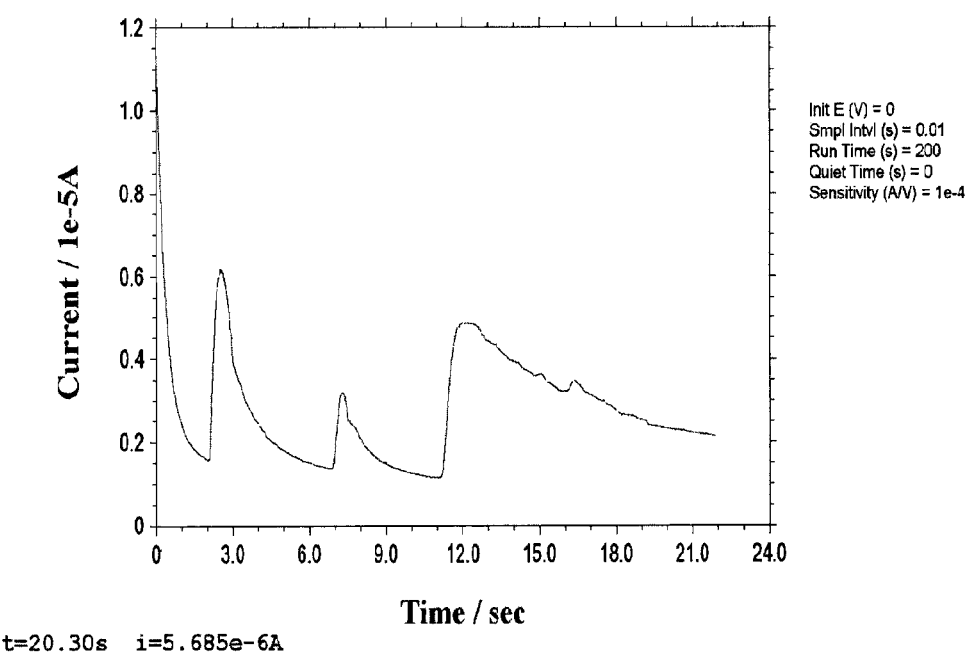
FIG. 8

Referring to FIG. 8, determining an Amperometric I-T can be accomplished using the device of FIG. 1. A constant voltage is applied to the sensor so that only applied force is measured. By examining an Amperometric I-T graph, the force applied at any specific time can be deduced.

Figure 9:
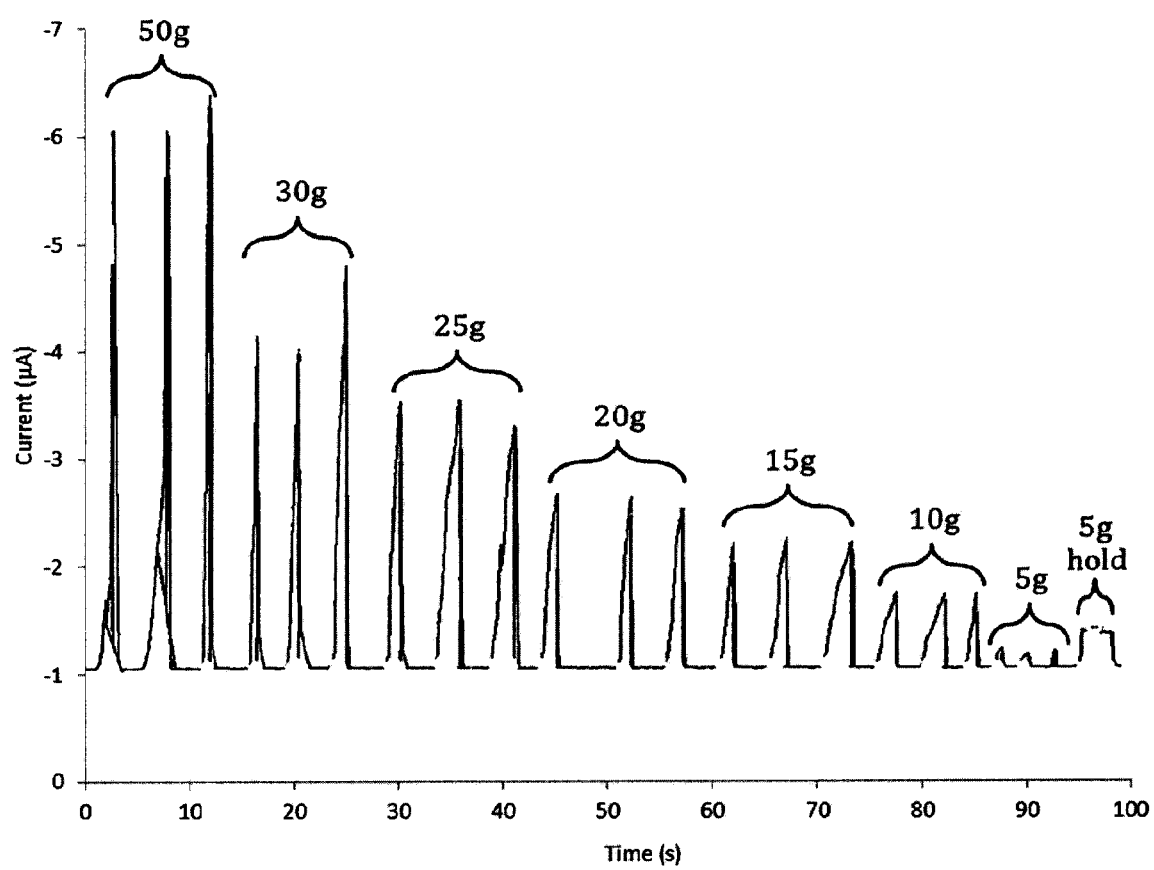
FIG. 9 illustrates Amperometric I-T consistent, raw data which Applicants' sensor is capable of recording.

FIG. 9 shows Amperometric I-T consistent, raw data which the Applicants' sensor is capable of recording. The data shows one-shot and sustained hold (redox reaction), repeatability, and extensive range. Furthermore, constant applied pressures can be seen and examined, as shown at the right of FIG. 9.

The data of FIG. 9 was obtained at an initial voltage of 0.45 V and the sampling rate was 1 sample/s.\

Figure 10A:
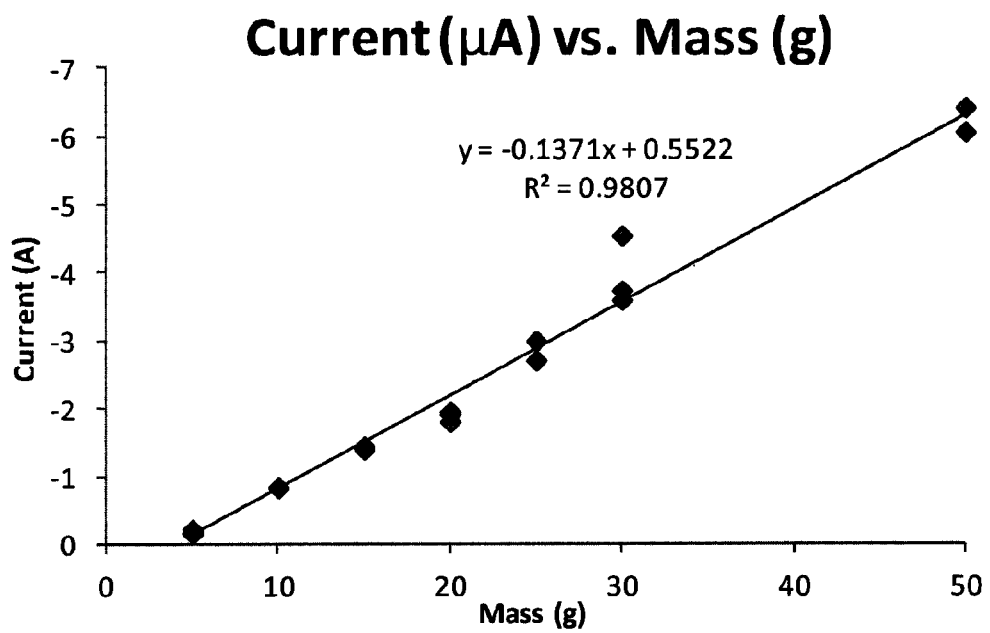
FIG. 10A shows a calibration curve of current versus mass for the data of FIG. 9.
Figure 10B:
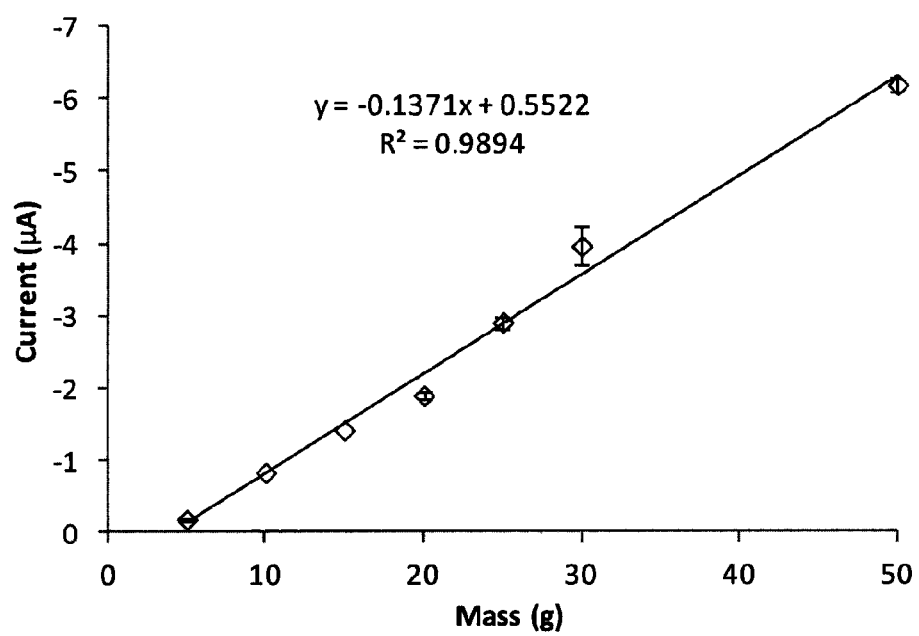
FIG. 10B shows data wherein three current measurements at each mass were averaged, and standard deviation bars.

FIG. 10A shows a calibration curve of current versus mass for the data of FIG. 9. A strong correlation value, 0.8918, was calculated between mass applied and current measured, thereby demonstrating a linear relationship between the two variables. In FIG. 10B, three current measurements at each mass were averaged. In addition, standard deviation bars are displayed.

Figure 11A:
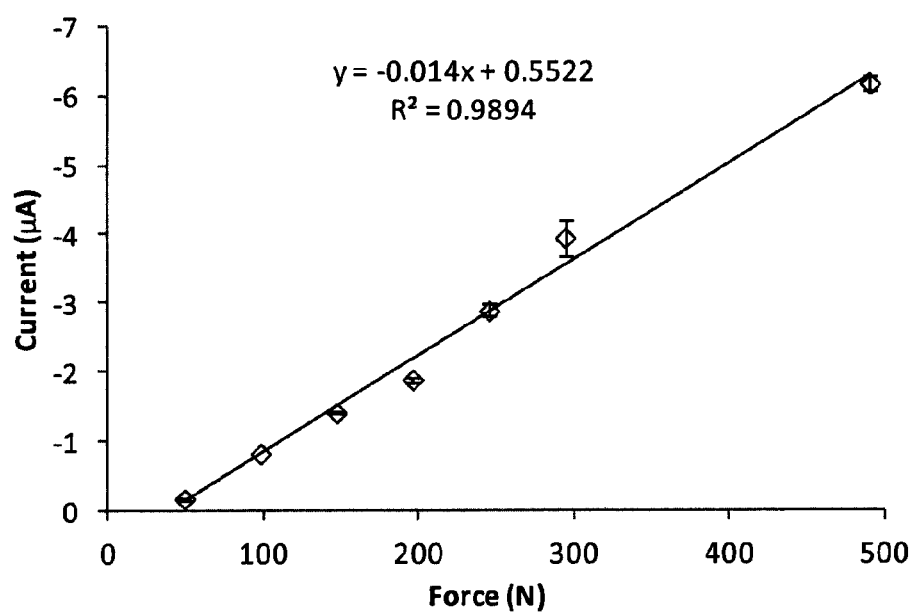
FIG. 11A shows the data of FIG. 9 used to allow current to be measured against force using Newton's second law; and FIG. 11B
Figure 11B:
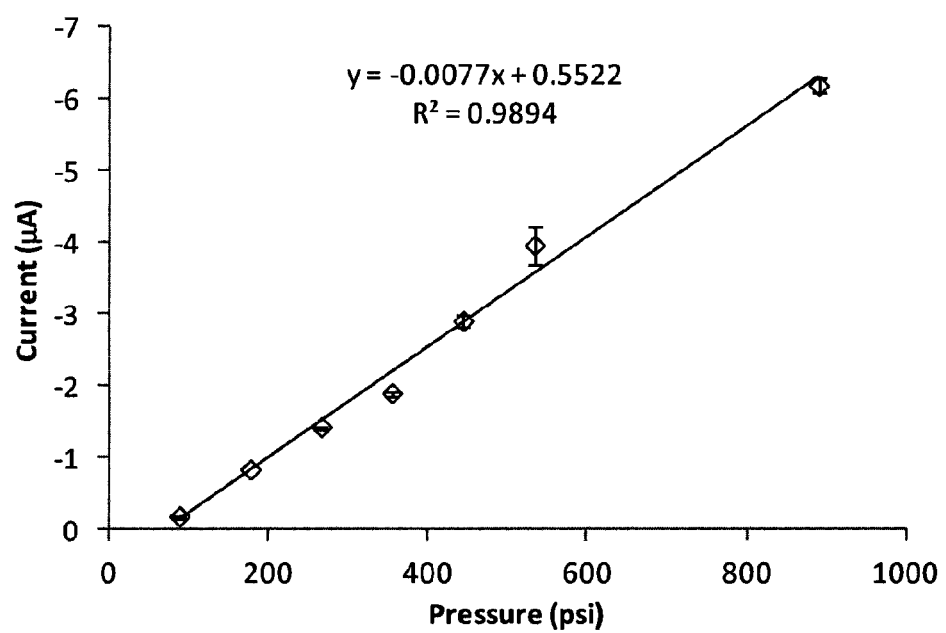

FIG. 11A shows the data of FIG. 9 used to allow current to be measured against force using Newton's second law. FIG. 11B FIG. 11A shows the data of FIG. 9 used to allow current to be measured against pressure FIGS. 11A and 11B demonstrates that Applicants' sensor can be applied to many differing applications. Thus, Applicants' sensor can be used in technologies in medical, engineering, and many other appliances.

Table 1 recites data for a Lower Limit of Detection (LLD) and an Upper Limit of detection (ULD) using the data of FIG. 9. In certain embodiments, the LLD can be set at (3.3*std dev5 A)/(slope of detection line). In certain embodiments, the ULD can be set at ULD=(10*std dev50 A)/(slope of detection line).

The described features, structures, or characteristics of the invention may be combined in any suitable manner in one or more embodiments. In the above description, numerous specific details are recited to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention. In other words, the present invention may be embodied in other specific forms without departing from its spirit or essential characteristics. The described implementations are to be considered in all respects only as illustrative and not restrictive. The scope of the invention should, therefore, be determined not with reference to the above description, but instead should be determined with reference to the pending claims along with their full scope or equivalents, and all changes which come within the meaning and range of equivalency of the claims are to be embraced within their full scope.

We claim:

1. An electrochemical sensor, comprising:
   a substrate;
   a first, second, and third electrode each screen printed onto the substrate, wherein the third electrode is a reference electrode;
   an elastomer impregnated with a ferricyanide solution, the elastomer being disposed over only the first electrode; and
   a compressible polymeric material continuously disposed over and in contact with the elastomer and the first, second, and third electrodes;
   wherein concentration of ferricyanide in contact with the first electrode increases upon application of a compressive force to the compressible polymeric material causing current flow between the first and second electrodes to increase proportionally to the applied compressive force.

2. The electrochemical sensor of claim 1, wherein the elastomer is selected from the group consisting of a hydrogel, polyurethane foam, and compressible inks.

3. The electrochemical sensor of claim 1, wherein the ferricyanide solution comprises potassium ferrocyanide.

4. The electrochemical sensor of claim 1, wherein the sensor is configured such that a voltage present across the first and second electrodes causes the current to flow between the first and second electrodes.

5. The electrochemical sensor of claim 1, wherein the substrate is flexible.

6. The electrochemical sensor of claim 2, wherein the compressible material is a polyurethane foam comprising a styrene-ethylene-butylene-styrene copolymer coating.

7. A prosthetic device comprising a plurality of the electrochemical sensors of claim 1 disposed on a surface of the prosthetic device.

8. The prosthetic device of claim 7, comprising nine electrochemical sensors.

9. The prosthetic device of claim 8, comprising fourteen electrochemical sensors.

10. The prosthetic device of claim 7, additionally comprising a display device wherein signals from each of the electrochemical sensors is independently indicated.

11. The prosthetic device of claim 7, wherein the prosthetic device is configured such that a constant voltage is applied to all of the electrochemical sensors without compressive force applied to the compressible material.

12. The prosthetic device of claim 11, wherein the applied voltage is 0.45V.

13. A prosthetic device comprising at least nine electrochemical sensors and a display device, each electrochemical sensor comprising
   a flexible substrate;
   a first, second, and third electrode each screen printed onto the substrate, wherein the third electrode is a reference electrode;
   an elastomer impregnated with a ferricyanide solution, the elastomer being disposed over only the first electrode; and
   a compressible polyurethane foam continuously disposed over the elastomer and the first, second, and third electrodes; wherein concentration of ferricyanide in contact with the first electrode increases upon application of a compressive force to the compressible polyurethane foam causing current flow between the first and second electrodes to increase proportionally to the applied compressive force, and wherein the current between the first and second electrodes of each of the at least nine electrochemical sensors is independently indicated on the display device.

14. The prosthetic device of claim 13, comprising fourteen electrochemical sensors.

15. The prosthetic device of claim 13, wherein the polyurethane foam comprises a styrene-ethylene-butylene-styrene copolymer coating.

16. The prosthetic device of claim 13, wherein the ferricyanide solution comprises potassium ferrocyanide.

* * * * *

UNITED STATES PATENT AND TRADEMARK OFFICE
CERTIFICATE OF CORRECTION

PATENT NO. : 10,983,017 B2
APPLICATION NO. : 14/430856
DATED : April 20, 2021
INVENTOR(S) : Jeffrey LaBelle et al.

It is certified that error appears in the above-identified patent and that said Letters Patent is hereby corrected as shown below:

In the Specification

Column 1, Line 67, "Fig. 8" should be --Fig. 8 is an Amperometric I-T graph showing the current in relation to the time in seconds. By applying a constant voltage to the sensor the applied force can be measured and the force applied at any specific time can be deduced.--.

Column 3, Line 38, "amperometric it observed" should be --amperometric i*t observed--.

Signed and Sealed this
Fourth Day of January, 2022

Drew Hirshfeld
*Performing the Functions and Duties of the*
*Under Secretary of Commerce for Intellectual Property and*
*Director of the United States Patent and Trademark Office*